United States Patent Office 2,773,099
Patented Dec. 4, 1956

2,773,099

METHOD FOR THE PREPARATION OF α-SUBSTITUTED ORGANIC CARBONYL COMPOUNDS

Gilbert Stork, Leonia, N. J.

No Drawing. Application September 3, 1954,
Serial No. 454,200

16 Claims. (Cl. 260—586)

The present invention relates to a novel method for the preparation of α-substituted organic carbonyl compounds.

More particularly, the present invention relates to the production of α-substituted carbonyl compounds, such as aldehydes and ketones, by the reaction of their respective enamines with alkylating or acylating agents to form an α-carbon substitution product, followed by water decomposition to obtain the α-substituted carbonyl compound.

The α-substituted carbonyl compounds of the type produced in accordance with the novel reaction of the present invention are known useful compounds. Typical examples of compounds of this type are the α-substituted derivatives of cyclic ring compounds which contain a keto group. Thus, for example, the α-alkyl derivatives of cyclopentanone and cyclohexanone, prepared in accordance with the new process, may be transformed into corresponding lactams, for example in accordance with the method disclosed in Patent No. 2,221,369 by rearrangement of their oximes, or they may be converted into useful amines by catalytic hydrogenation as shown in Patent No. 2,181,140, for subsequent conversion into linear polyamides for polymeric materials, synthetic fibers, and the like. Or the lactams can be converted by direct polymerization into polyamides of the nylon type, this being one of the industrially important ways of producing fibers, filaments and like objects. The lactams prepared from cyclohexanone and its α-substitution products are important intermediates in the preparation of soluble types of interpolymers which are useful in the manufacture of coated fabrics, films, wrapping materials and protective coatings for containers. Cyclohexanone and its α-substitution products are also of importance as reagents in the synthesis of steroids, wherein they perform the function of hydrogen acceptors in the Oppenauer oxidation of secondary steroidal alcohols. Accordingly there is made possible by the new method not only the simplified and more efficient preparation of many known compounds, but also a wide variety of new products.

According to known methods of synthesis, the introduction of substituents in the α position of carbonyl containing compounds requires a sequence of numerous steps, including, for example, the use of strong bases of the type of alkali metal amides and the like, or prior transformation of the carbonyl compound into a beta-keto ester which must then be alkylated and decarboxylated. In addition, the strong bases used are likely to cause damage to sensitive groups either in the compound being treated or in the compound furnishing the α-substituent group.

In my U. S. application Serial No. 454,199, filed as of even date herewith there is disclosed a direct method using no bases or catalysts involving merely the warming of an enamine compound with an α,β unsaturated organic compound followed by water decomposition to form an α-carbon substituted carbonyl compound.

In accordance with the present invention it has been discovered that an alkyl or acyl group may also be substituted at a position α to the carbonyl of five and six-membered cyclic organic compounds and especially those compounds wherein the carbonyl group is present on a six-membered saturated carbocyclic ring, by reaction of such compounds with secondary amines to form the corresponding enamine followed by the reaction of the enamine with an alkylating agent such as an alkyl halide or with an acylating agent such as acyl halide or acid anhydride.

The method of the present invention may be carried out using a wide variety of cyclic compounds, including both monocyclic and polycyclic ring systems containing a keto group on a six membered saturated carbocyclic ring.

The preparation of the enamine condensation products of the carbonyl containing starting material is carried out according to known methods. Any carbonyl compound of the character described which has a hydrogen atom on a carbon atom contiguous to the carbonyl group can be reacted with a secondary amine in a suitable solvent to form the enamine. The secondary amines used to prepare the enamines may be selected from a large variety of such compounds, but those are preferred which permit formation of the enamines by azeotropic distillation of the water formed in the condensation. For this purpose, pyrrolidine or ring-alkylated pyrrolidines have been found preferable in respect to yield and convenience of operation. However, other secondary amines, such as trimethyleneimine and piperidine may also be used.

The enamine condensation products are reacted with an alkylating agent such as an alkyl halide, or with an acylating agent such as an acyl halide or an acid anhydride. The alkylating agent may contain functional groups which remain as part of the alkyl substituent. Examples of alkylating agents include methyl iodide, propyl iodide, ethyl bromoacetate, benzyl chloride, and β-phenylethyl bromide. Examples of acylating agents include acetic anhydride, benzoyl chloride, and ethyl chlorocarbonate.

In carrying out the process of the present invention, the crucial carbon-to-carbon bond forming step may be made to take place merely on warming the alkylating or acylating agent together with the enamine in an inert non-aqueous solvent, the decomposition of the resulting product to the desired α-substitution product taking place simply on warming with water. In many cases, especially with ketones of suitable boiling points, it is unnecessary to isolate the condensation product of the ketone and the secondary amine, since this condensation may be effected, for example, by heating a mixture of ketone, amine and azeotrope solvent to bring about removal of water of condensation, with recovery of the solvent. The solvent may be used in the next step of the synthesis, or the latter may be conducted in a different solvent. Thus, it is unnecessary to isolate the substitution product before decomposition with water, and the entire transformation may be performed in a single operation. As solvents for conducting the α-substitution reaction, there is a wide choice of those in which the enamine and the reagent are stable. Examples of inert, non-aqueous solvents include ethers such as glycol ethers, dioxane, tetrahydro furane, and hydrocarbons such as benzene, toluene, and xylene. Alcohols such as methanol, ethanol and butanol, can be used in cases where the reagent, for example, the acid halide or anhydride, does not react with the alcohol solvent.

The new method of the present invention also makes possible the introduction of a single substituent group at the α-position, in contrast with existing techniques which yield difficultly separable mixtures of polysubstituents.

The following examples serve to illustrate, but are not intended to limit, the present invention:

*Example I*

The enamine from cyclohexanone is prepared by refluxing 2 g. of cyclohexanone with 6.6 ml. pyrrolidine in 35 ml. of benzene for half an hour, using a water separator to remove the water formed in the condensation. The benzene is then removed, and replaced by 25 ml. of methanol. After addition of 10 ml. of methyl iodide the mixture was refluxed for 25 hours, most of the solvent was removed, 25 ml. of water was added and heating was continued for another half hour. The mixture was then worked up by adding 10 ml. 10% $H_2SO_4$ and salt solution and extraction with ether. The ether was washed with salt solution and thiosulfate, dried and distilled giving about 60% of 2-methyl cyclohexanone, further characterized by its dinitrophenylhydrazone, melting point 133–4° (from alcohol).

Example II 117 g. of 4-hydroxycyclohexanone benzoate was converted into its enamine by refluxing with 176 ml. of pyrrolidine in 1300 ml. of benzene. Evaporation of the solvent and replacement by 1300 ml. of dry methanol was followed by addition of 510 ml. of methyl iodide. After refluxing for 21 hours, most of the solvent was removed, 1 l. of water was added and the solution was refluxed for another one half hour. The solution was then poured into 100 ml. of $5NH_2SO_4$, and extracted with ether giving after washing with salt solution and thiosulfate, drying and distillation 70% yield of 2-methyl-4-hydroxycyclohexanone benzoate identified by comparison with an authentic sample made from toluhydroquinone.

Example III 5 g. of the enamine from cyclohexanone (prepared as in Example I) was refluxed for 12 hours in 25 ml. of dioxane with 6 g. of benzyl chloride. After addition of 5 ml. of water the solution was boiled another hour, some of the solvent was removed under vacuum, water was added and the product was extracted with ether. The ether extract was washed with 5% hydrochloric acid, with bicarbonate solution and finally with water. After drying over magnesium sulfate the solvent was removed and the product was distilled under vacuum giving, in about 60% yield, 2-benzyl cyclohexanone, boiling point 160–165°/18 mm.; this was further identified as its oxime, melting point 126–127° (from methanol) and as the semicarbazone, melting point 166–167° (from methanol).

The same reaction can be carried out in other solvents, for instance, anhydrous methanol or ethanol with the same results.

Example IV

The enamine from cyclohexanone (10 g.) was refluxed 12 hours in 100 ml. of dioxane with 40 g. of propyl iodide. After addition of 25 ml. of water the solution was heated one hour longer and was worked up as in Example III, yielding 2-propyl cyclohexanone, boiling point 87–90°/15 mm., further characterized as its oxime, melting point 67–68° (from aqueous methanol).

Example V 10 g. of enamine from cyclohexanone was refluxed for several days with 25 g. of β-phenyl ethyl bromide in 50 ml. of dioxane; after addition of 25 ml. of water and refluxing for an additional hour the solution was worked up as usual giving 2-β-phenylethyl cyclohexanone, boiling point 165–170°/15 mm.

Example VI 14 g. of enamine from cyclohexanone was refluxed for 12 hours in 150 ml. of dry methanol with 20 g. of ethyl bromoacetate. Addition of 10 ml. of water and refluxing for 1 hour, followed by working up as usual gave 50–60% yield of the ethyl ester of cyclohexanone-2-acetic acid, boiling point 134–135°/13 mm., further characterized as its semicarbazone, melting point 196–197° (from 95% alcohol). The same result was obtained in ethanol solution. The enamine made with piperidine instead of pyrrolidine gave the same product in lower yield.

Example VII

The enamine prepared by heating in a nitrogen atmosphere a mixture of 5-phthalimido-β-tetralone (10 g.) and 10 ml. of pyrrolidine in benzene solution with a water separator until water was no longer formed was refluxed for 60 hours in 20 ml. of dioxane with 12 ml. of methyl iodide. The mixture was heated with 20 ml. water for two hours and finally poured onto ice yielding directly 1-methyl-5-phthalimido-β-tetralone, melting point 181–183°, in over 60% yield.

Example VIII

The enamine prepared similarly from β-tetralone itself gave, under similar conditions, about 80% yield of 1-methyl-β-tetralone.

Example IX

Similarly the enamine prepared from 7-methoxy-β-tetralone gave 1-methyl-7-methoxy-β-tetralone identical with an authentic specimen.

Example X 13 g. of enamine from cyclohexanone was dissolved in 50 ml. of dioxane and treated with cooling with 13 g. of benzoyl chloride. After standing at room temperature for 12 hours the mixture was refluxed one hour, 10 ml. of water was added, followed by heating for one hour. The mixture was worked up as usual except that the final ether extract was extracted with cold dilute sodium hydroxide solution to remove the acidic β-diketone from neutral by-products; the aqueous base solution was then acidified and the liberated product was taken up in ether giving after removal of the solvent 2-benzoyl cyclohexanone, melting point 89–91° (from aqueous methanol).

Example XI 10 g. of enamine from cyclohexanone was kept in 20 ml. of dioxane with 8 g. of acetic anhydride for twenty hours at room temperature. Addition of 5 ml. of water and heating for one half hour gave after removal of some dioxane under vacuum and extraction with ether, washing with dilute hydrochloric acid, water and drying 2-acetylcyclohexanone, boiling point 97–104°/12–14 mm. in about 50% yield.

Example XII 10 g. of enamine from cyclohexanone in 25 ml. of dioxane was treated with 10 g. of freshly distilled ethyl chlorocarbonate with initial cooling. After standing 5 hours at room temperature, 15 ml. of dimethyl formamide was added to dissolve the initially formed precipitate and the solution was allowed to stand for 12 hours at room temperature. After addition of 10 ml. of water and refluxing for an additional ¾ hour, usual work up gave about 40–50% yield of 2-carbethoxycyclohexanone, boiling point 100–105°/10 mm., further characterized by its infrared spectrum and its dinitrophenylhydrazone, melting point 154–156°.

Example XIII

The enamine from cyclopentanone is prepared as in Example I by refluxing cyclopentanone with pyrrolidine in benzene, followed by removal of the solvent. 12 g. of enamine is refluxed for 12 hours in 150 ml. of dry ethanol with 20 g. of ethyl bromoacetate. Addition of 10 ml. of water and refluxing for 1 hour, followed by separation, gave a 50% yield of the ethyl ester of cyclopentanone-2-acetic acid, together with some diethyl ester of cyclopentanone-2-6-diacetic acid.

In all of the above specific examples, the temperatures indicated are given in degrees centigrade.

I claim:

1. A method for the preparation of α-substituted five- and six-numbered ring compounds containing a keto group which comprises condensing a compound selected from the group consisting of five- and six-membered saturated cyclic ring compounds containing a keto group with a secondary amine to form an enamine, reacting the enamine with a member of the group consisting of alkylating and acylating agents in an organic solvent to effect substitution in the α position, and decomposing the resulting α-substitution product with water.

2. A method for the preparation of α-substituted six-membered cyclic ring compounds containing a keto group which comprises condensing a six-membered saturated cyclic ring compound containing a keto group with a secondary amine to form an enamine, reacting the enamine with a member of the group consisting of alkylating and acylating agents in an organic solvent to effect substitution in the α position, and decomposing the resulting α-substitution product with water.

3. A method for the preparation of α-substituted five- and six-membered cyclic ring compounds containing a keto group which comprises condensing a compound selected from the group consisting of five- and six-membered saturated cyclic ring compounds containing a keto group with a secondary amine to form an enamine, reacting the enamine with an acylating agent selected from the group consisting of acyl halides and acid anhydrides in an organic solvent to effect substitution in the α position, and decomposing the resulting α-substitution product with water.

4. A method for the preparation of α-substituted six-membered cyclic ring compounds containing a keto group which comprises condensing a six-membered saturated cyclic ring compound containing a keto group with a secondary amine to form an enamine, reacting the enamine with an acylating agent selected from the group consisting of acyl halides and acid anhydrides in an organic solvent to effect substitution in the α position, and decomposing the resulting α-substitution product with water.

5. A method for the preparation of α-substituted six-membered cyclic ring compounds containing a keto group which comprises condensing a six-membered saturated cyclic ring compound containing a keto group with a secondary amine to form an enamine, reacting the enamine with an alkylating agent in an organic solvent to effect substitution in the α-position, and decomposing the resulting α-substitution product with water.

6. The method of claim 5, wherein the alkylating agent is an alkyl halide.

7. A method for the preparation of α-substituted derivatives of cyclohexanone which comprises condensing cyclohexanone with a secondary amine to form an enamine, reacting the enamine with a member of the group consisting of alkylating and acylating agents in an organic solvent to effect substitution in the α position, and decomposing the resulting α-substitution product with water.

8. The method of claim 7 wherein the alkylating agent is an alkyl halide.

9. The method of claim 7 wherein the acylating agent is an acyl halide.

10. The method of claim 7 wherein the acylating agent is an acid anhydride.

11. A method for the preparation of an α-substituted β-tetralone which comprises condensing the β-tetralone with a secondary amine to form an enamine, reacting the enamine with a member of the group consisting of alkylating and acylating agents in an organic solvent to effect substitution in the α position and decomposing the resulting α-substitution product with water.

12. The method of claim 11 wherein the alkylating agent is an alkyl halide.

13. A method for the preparation of an α-substituted cyclopentanone which comprises condensing cyclopentanone with a secondary amine to form an enamine, reacting the enamine with a member of the group consisting of alkylating and acylating agents in an organic solvent to effect substitution in the α position and decomposing the resulting α-substitution product with water.

14. The method of claim 13 wherein the alkylating agent is an alkyl halide.

15. The method of claim 13 wherein the acylating agent is an acyl halide.

16. The method of claim 13 wherein the acylating agent is an acid anhydride.

References Cited in the file of this patent

Herr et al.: J. A. C. S. 75, 5927–8 (December 1953).